Figure 1:
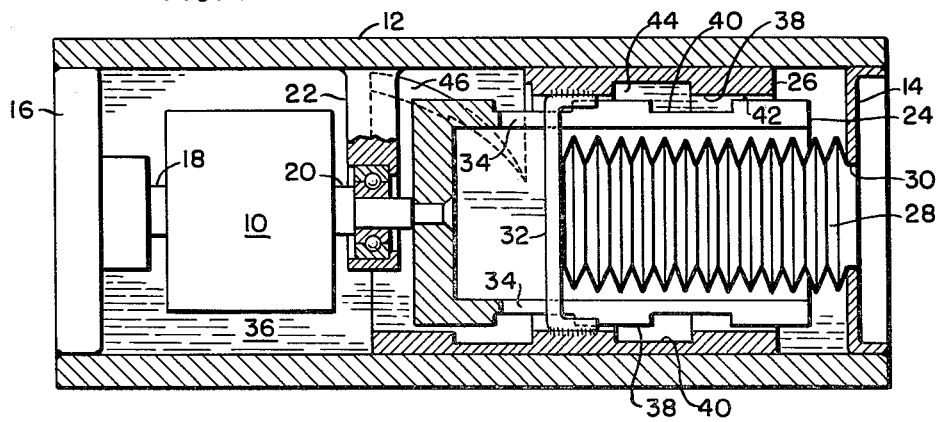

Jan. 26, 1965   J. F. HUFF   3,166,942
DAMPING DEVICE
Filed Jan. 7, 1964

INVENTOR.
JOSEPH F. HUFF
BY
ATTORNEYS

United States Patent Office 3,166,942
Patented Jan. 26, 1965

3,166,942
DAMPING DEVICE
Joseph F. Huff, Hyde Park, Mass., assignor to Northrop Corporation, Beverly Hills, Calif., a corporation of California
Filed Jan. 7, 1964, Ser. No. 336,228
12 Claims. (Cl. 74—5.5)

This invention relates to a device for damping rotational movement.

Damping devices are commonly used, for example, in a rate gyroscope to damp rotation of the gyroscope gimbal relative to the outer casing. The present invention may be employed to advantage in such an environment, and will be described as incorporated in a rate gyroscope.

Related prior damping devices for rate gyroscopes generally include two members, one attached to and rotating with the gyroscope gimbal, and the other fixed to the casing. The two members are positioned with surfaces near and facing one another, and the gap between the facing surfaces is filled with a damping liquid. The damping liquid is sheared, in effect, by rotation of one member relative to the other, which shearing results in a restraining or damping force opposing rotation of the gyroscope gimbal. In precision gyroscopes, this damping force must be absolutely constant, or an error will occur. Since liquid viscosity changes with temperature, the damping device of a precision gyroscope must in some manner compensate for any change in the temperature and viscosity of the damping liquid to maintain the damping force constant throughout a range of temperatures. Such compensation may be obtained by moving one of the members to vary the spacing between their facing surfaces as the temperature of the damping liquid changes. This movement, commonly automatically accomplished by a bellows, varies the shear gap between the facing surfaces of the members, and thus varies the damping force. Damping devices of this sort are described in Steele U.S. Patent No. 2,902,863 and Bostwick et al. U.S. Patent No. 2,984,114.

The temperature compensation afforded by this type of damping device is limited by the range of movement provided for one member relative to the other, which determines the minimum and maximum shear gap. The compensation also is only an approximation, for the viscosity of damping liquids does not change linearly with temperature. This induces an error.

A primary object of the present invention is to obtain an absolutely constant damping force throughout a wide range of temperatures. Other objects will become apparent as this description proceeds.

In general, the damping device of the present invention includes two cylindrical members, preferably right circular cylindrical members, one positioned within and concentric with the other, providing a shear gap between their facing surfaces. One of the cylindrical members may be attached to the gyroscope gimbal, and the other to the outer casing of the gyroscope, as by a bellows. Thus, when the gyroscope gimbal rotates within the casing, one cylindrical member will rotate within the other. To restrain and damp such rotation, a damping liquid is provided in the shear gap between their facing surfaces. To permit maximum variation of the damping force with a limited longitudinal movement of the bellows controlled cylinder, the facing surfaces of the cylindrical members are grooved, forming opposed lands and grooves, which result in correspondingly narrow shear gaps and wide spaces between the members. The maximum damping force will be exerted when the lands face one another and the total shear gap area is a maximum, and the minimum damping force when the grooves face the lands and the total shear gap area is a minimum. To vary the damping force, a bellows is connected to one of the cylindrical members to move it longitudinally relative to the other cylindrical member, and vary the facing, or radially overlapping, relation of the lands and grooves, thereby varying the total shear gap area and the damping force. The width of the lands and grooves may be equal to the range of axial movement afforded by the bellows to maximize the obtainable temperature compensation and variation in the damping force. To compensate for non-linear changes, a longitudinal slot may be provided in one of the cylindrical members to vary the total shear gap area as the extent to which it radially overlaps the other member varies. Thus, in its preferred embodiment, the damping device of the present invention will compensate even for non-linear variations to exert a constant damping force on the rate gyroscope gimbal over a wide range of temperatures, with only a small longitudinal movement of one cylindrical member relative to the other.

Figure 2:
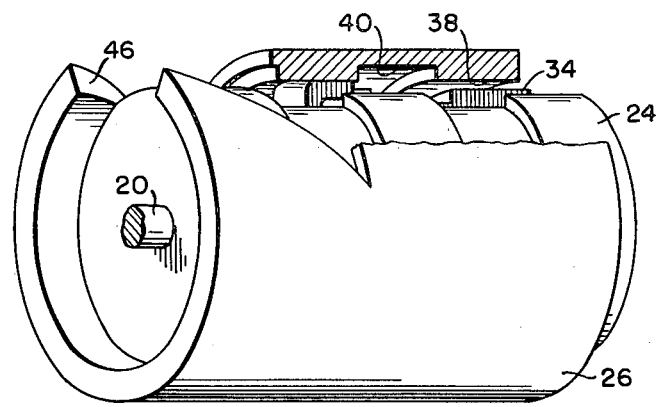
Figure 3:
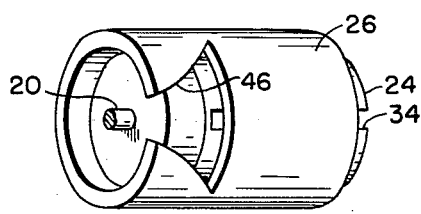

A preferred embodiment of the invention will be further described in connection with the accompanying drawings in which:

FIG. 1 is a view generally in cross-section of a rate gyroscope incorporating the damping device of the present invention, FIG. 2 is an enlarged side view in perspective of the concentric cylindrical members of the damping device displaced slightly from one another, a portion of the outer cylindrical member being broken away, and FIG. 3 is a top view in perspective of the set of concentric cylindrical members shown in FIG. 2, but on a reduced scale.

A rate gyroscope assembly which includes the damping device of the present invention is illustrated in FIG. 1. The rate gyroscope is mounted within a gimbal 10, which in turn is housed within a cylindrical casing 12 having end caps 14 and 16. The gimbal 10 is mounted for rotation on opposed trunnions 18 and 20. The trunnion 18, which may include a torsion wire, is attached to the end cap 16 and permits at least restrained rotational movement of the gimbal relative to the casing. The trunnion 20 extends through and is supported for rotation by bearings in an arm 22 attached to the inner wall of casing 12. The trunnions 18 and 20 hold the rate gyroscope gimbal in a fixed longitudinal position centered on the longitudinal axis of casing 12, while permitting limited rotation of the gimbal relative to the casing. Normally, the maximum extent of rotation of the rate gyroscope gimbal relative to the casing is on the order of six degrees. Since the gyroscope, its mounting in the gimbal, and the trunnion mounting of the gimbal all are conventional in this art, they will not be described in further detail.

The device for damping rotational movement of the gimbal relative to the casing includes two cylindrical members, an inner cup-shaped right circular cylindrical member 24 received within an outer hollow right circular cylindrical member 26. The outer end of trunnion 20 extends past arm 22, and is attached to the center of the base of the inner cylindrical member 24, positioning and supporting it concentric with the casing 12. The outer cylindrical member is slidably received for longitudinal movement within casing 12 and over the inner cylindrical member. The inner cylindrical member rotates with the gyroscope gimbal 10, while the outer cylindrical member is prevented from rotating, as by being keyed to the casing to permit only longitudinal movement.

A bellows 28 for varying the relative longitudinal position of the concentric cylindrical members is received within the inner cylindrical member 24. The open end of the bellows is sealed to the end cap 14 about a central opening 30. The inner closed end of the bellows is attached to a bracket 32. The outer end portions of bracket 32 extend through longitudinal slots 34 in the inner cylindrical member, and are turned to abut the inner surface of the outer cylindrical member, to which they are attached, as by spot welds. The longitudinal slots 34 in the inner cylindrical member are long and wide enough to permit free longitudinal movement of the bracket, and the maximum normal rotational movement of the inner cylindrical member without it touching the bracket. The casing 12, the end caps, and the bellows 28 form an enclosed cavity which is filled with a conventional damping liquid 36 such as a silicone oil.

Circumferentially extending lands 38 and grooves 40 are provided at the outer cylindrical surface of the inner cylindrical member 24, and at the inner cylindrical surface of the outer cylindrical member 26. When the cylindrical members are positioned relative to one another, as shown in FIG. 1, the radially projected area of one land will overlap approximately one-half of the facing land; hereinafter this relationship will be referred to simply as the facing or overlapping relationship of the lands.

The size of the cylindrical members relative to one another is such that only a very narrow shear gap 42 is provided where the lands overlap and directly face one another, and a much wider space 44 is provided where the lands on one cylindrical member overlap and face the grooves of the other cylindrical member. The damping liquid fills the space between the cylindrical members. Accordingly, when the lands fully and completely overlap one another, maximum damping is exerted by the outer cylindrical member, held against rotation relative to the casing, through the damping liquid on rotation of the inner cylindrical member with the gyroscope gimbal; similarly, minimum damping is exerted when the lands of one cylindrical member fully overlap the grooves of the other cylindrical member. Thus, the total damping force is directly related to the total shear gap area, which in turn is directly related to the total overlapping area of the lands. Thus, by varying the longitudinal or axial alignment of the cylindrical members, which in turn varies the overlapping relationship of the lands, the total shear gap area may be varied. This in turn varies the total damping force exerted by the outer cylindrical member on rotation of the inner cylindrical member and the gyroscope gimbal.

Changes in environmental temperature cause a change in the volume and viscosity of the damping liquid 36 which causes the bellows 30 to axially contract or expand. Because the free inner end of the bellows is attached to bracket 32, which in turn is attached to the outer cylindrical member 26, contraction or expansion of the bellows moves the outer cylindrical member 26 longitudinally relative to both the casing 12 and the inner cylindrical member 24. This in turn changes the overlapping alignment of the lands 38 and the grooves 40, thereby varying the damping force to compensate for changes in the viscosity of the damping liquid throughout a range of temperatures.

For example, should the environmental temperature rise and the damping liquid expand, bellows 30 would be forced to contract, moving the outer cylindrical member 26 to the right and increasing the overlapping area of lands 38. This would tend to increase the damping force, to offset the reduced viscosity of the damping liquid due to the rise in environmental temperature, and to maintain the damping force relatively constant.

Any number of opposed lands and grooves may be provided in the facing surfaces of the cylindrical members 24 and 26. For a given extent of longitudinal movement between the concentric cylindrical members, the maximum variation in damping force will be obtained when the width of the lands and grooves is equal to the extent of longitudinal movement. Thus, in one extreme position, the lands of one member will totally overlap the grooves of the other member to exert the minimum damping force, while, in the other extreme position, the lands will totally overlap one another to exert the maximum damping force. However, this relative longitudinal movement of the concentric cylindrical member will vary generally in a linear fashion. Normally the viscosity of the damping liquid varies non-linearly.

Compensation for non-linear changes in damping liquid viscosity may be obtained by providing a longitudinal slot 46 in one of the cylindrical members, the width of the slot varying non-linearly with respect to length, as best illustrated in FIGS. 2 and 3. The slot may extend entirely across the cylindrical member, or only part way across it; it may have divergent or convergent sides, which may be straight or curved; one or more slots may be provided. The shape of the slot or slots in the cylindrical member will depend primarily upon the damping fluid used, and the damping characteristic desired. Because of the slot, as the concentric cylindrical members are longitudinally moved relative to one another by bellows 30 and bracket 32 due to changes in environmental temperature, the total shear gap area between the concentric cylindrical members will be varied both by the altered alignment of the overlapping lands and grooves, and by the altered extent to which slot 46 overlaps the inner cylindrical member 24. The latter variation results in a non-linear change in the total damping force, because the width of the slot varies non-linearly with length, thereby non-linearly varying the total shear gap area.

For example, in the illustrated construction of the damping device, the sides of slot 46 in the outer cylindrical member 26 curve and diverge outwardly from the end of the member towards its center. As the outer cylindrical member is moved to the right, more and more area of the lands of the concentric cylindrical members will overlap, increasing the total shear gap area and thus the damping force. Yet, because of slot 46, as the outer cylindrical member is moved to the right, more and more area of the lands on the inner cylindrical member will be exposed at the base of the slot, and covered by the converging sides of the slot, producing a net change in the total shear gap area and damping force. By appropriately shaping slot 46, any of a range of compensations in the total damping force may be obtained. This results in a damping device which will exert a constant damping force on rotation of the gyroscope gimbal throughout a range of temperatures, or which will exert any of a range of linearly or non-linearly varying damping forces on rotation of the gyroscope gimbal.

As previously shown, the damping device of the present invention, for a given relative longitudinal movement of the concentric cylindrical members, may maximize the variation in the damping force and also may provide any desired damping characteristic. Thus, it efficiently and effectively compensates for variations in the viscosity of the damping liquid 36 with variations in the environmental temperature, to provide the desired damping force of the gyroscope gimbal.

It should be noted that, as illustrated, the sizes of the members forming the damping device relative to one another, and relative to the gyroscope and the casing, have been exaggerated somewhat for purposes of clarity.

While a preferred embodiment of the invention has been described and illustrated, it is to be understood that variations in the details of the damping device may be made without departing from the spirit or scope of the invention.

I claim:

1. A device for damping rotation of a first element relative to a second element comprising a first and a second cylindrical member concentric with one another, one of the cylindrical members being disposed at least partially within the other cylindrical member to provide facing cylindrical surfaces, the first cylindrical member being attached to the first element and the second cylindrical member being attached to the second element whereby the cylindrical members are rotated relative to one another by the elements, the facing surfaces of the cylindrical members each including at least one land and one groove providing overlapping lands and grooves in said concentric cylindrical members, means for moving one cylindrical member longitudinally relative to the other cylindrical member, and a damping liquid between the facing surfaces of the cylindrical members whereby the damping liquid between the overlapping lands exerts a damping force restricting relative rotational movement of the cylindrical members and whereby the damping force is varied by longitudinal movement of one cylindrical member relative to the other cylindrical member to vary the overlapping area of the lands.

2. A damping device as set forth in claim 1 in which the planes described by the average diameters of the lands and grooves of the facing cylindrical surfaces are right circular cylindrical planes.

3. A damping device as set forth in claim 1 including at least one longitudinally-extending slot in at least one of the cylindrical members to vary the total overlapping area of the lands as the cylindrical members are moved longitudinally relative to one another.

4. A damping device as set forth in claim 3 in which the widtth of the slot varies non-linearly with length.

5. A damping device as set forth in claim 4 in which the planes described by the average diameters of the lands and grooves of the facing cylindrical surfaces are right circular cylindrical planes.

6. A device for damping rotational movement of a gyroscope relative to its casing comprising an inner and an outer cylindrical member concentric with one another, the inner cylindrical member being disposed at least partially within the outer cylindrical member to provide facing cylindrical surfaces, one of the cylindrical members being attached to the gyroscope and the other of the cylindrical members being attached to the casing whereby the cylindrical members are rotated relative to one another by rotational movement of the gyroscope relative to the casing, the facing surfaces of the cylindrical members each including at least one land and one groove providing overlapping lands and grooves in said concentric cylindrical members, means for moving one cylindrical member longitudinally relative to the other cylindrical member, and a damping liquid between the facing surfaces of the cylindrical members whereby the damping liquid between the overlapping lands exerts a damping force restricting relative rotational movement of the cylindrical members and whereby the damping force is varied by longitudinal movement of one cylindrical member relative to the other cylindrical member to vary the overlapping area of the lands.

7. A damping device as set forth in claim 6 including at least one longitudinally-extending slot in at least one of the cylindrical members.

8. A damping device as set forth in claim 7 in which the planes described by the average diameters of the lands and grooves of the facing cylindrical surfaces are right circular cylindrical planes.

9. A damping device as set forth in claim 8 in which said means for moving one cylindrical member longitudinally relative to the other cylindrical member comprises a bellows attached to the casing and extending longitudinally within the inner cylindrical member, and a bracket attached to the inner end of the bellows and to one of the cylindrical members whereby as the volume of the damping liquid changes with changes in environmental temperature, the longitudinal expansion of the bellows changes correspondingly, thereby moving the cylindrical member attached to it longitudinally relative to the other cylindrical member.

10. A damping device as set forth in claim 9 in which movement of the gyroscope relative to the casing is limited, and in which the inner cylindrical member includes a pair of diametrically opposed longitudinally-extending slots, said bracket extending through said slots and being attached to the outer cylindrical member.

11. A damping device as set forth in claim 10 in which the width of the lands and grooves in the opposed surfaces of the cylindrical members is substantially equal to the length of longitudinal travel of the outer cylindrical member as determined by the range of expansion of the bellows.

12. A damping device as set forth in claim 10 in which each cylindrical member includes a plurality of lands, the surfaces of the lands of each cylindrical member defining a single right circular cylindrical plane, and in which the width of at least one of said longitudinally-extending slots varies non-linearly with length.

No references cited.